United States Patent [19]

Espiritu Santo et al.

[11] Patent Number: 4,510,814
[45] Date of Patent: Apr. 16, 1985

[54] SNAP-IN FORCE SENSOR WITH BELLOWS

[75] Inventors: Eugenio Espiritu Santo; Kenneth D. Baxter, both of Cedar Falls, Iowa; Gary R. Bluem, Wayzata, Minn.

[73] Assignee: Deere & Company, Moline, Ill.

[21] Appl. No.: 364,372

[22] Filed: Apr. 1, 1982

[51] Int. Cl.³ .................................................. G01L 5/13
[52] U.S. Cl. ................................. 73/862.57; 73/862.64
[58] Field of Search ........... 73/862.57, 862.64, 862.03, 73/862.62; 172/7, 9

[56] References Cited

U.S. PATENT DOCUMENTS

| | | | |
|---|---|---|---|
| 3,022,663 | 2/1962 | Diddens | 73/862.64 |
| 3,141,327 | 7/1964 | Hartranft | 73/862.64 |
| 3,263,496 | 8/1966 | Fathauer | 73/862.64 |
| 3,303,447 | 2/1967 | Nevius | 73/862.64 |
| 4,253,331 | 3/1981 | Unruh | 73/862.62 |
| 4,386,533 | 6/1983 | Jackson et al. | 73/862.64 |

Primary Examiner—Anthony V. Ciarlante

[57] ABSTRACT

A snap-in LVDT force sensor includes a housing having separate chambers for enclosing an LVDT and an assembly of circuit components. One end of the housing is coupled for movement with one link of a two-link frame which is subject to the forces to be measured. A plunger is coupled for movement with the other link and includes a shaft which extends into one of the chambers to support an LVDT core for reciprocal movement within the LVDT coil assembly. A bellows is sealingly and flexibly coupled between the plunger and housing to provide protection from the environment. An optional spring may provide additional stiffness between the plunger and housing.

7 Claims, 4 Drawing Figures

SNAP-IN FORCE SENSOR WITH BELLOWS

BACKGROUND OF THE INVENTION

The present invention relates to a linkage and transducer assembly for sensing forces.

Various systems of linkages and transducers have been proposed to sense forces in members such as the links of the hitch for an agricultural implement. For example, U.S. Pat. No. 4,253,331 described a diamond-shaped frame with a load cell device inserted therein. Similarly, U.S. application, Ser. No. 332,577, filed Dec. 21, 1981 and assigned to the assignee of the present application, describes such a sensor system having a "snap-in" LVDT transducer. However, the "snap-in" design was expensive and difficult to manufacture and assemble due to the multiplicity of parts. For example, the separate sealing and biasing functions are performed by separate rubber boot and spring elements. Furthermore, in that design, the LVDT coil assembly is slidably received by one of the housing components and is therefore subject to wear caused by friction between the relatively movable parts. Accordingly, it would be desirable to have a simple and inexpensive "snap-in" type LVDT force sensor in which the LVDT coil assembly is protected from wear.

SUMMARY OF THE INVENTION

It is an object of the present invention to provide a simple and inexpensive "snap-in" type draft sensor.

Another object of the present invention is to provide a snap-in type draft sensor assembly wherein the sealing and biasing functions are performed by a single bellows element.

A further object of the present invention is to provide a "snap-in" type draft sensor with LVDT components which are protected from wear.

These and other objects are provided by the present invention which includes a housing having inner and outer chambers enclosed thereby. An LVDT coil assembly is enclosed within the inner chamber. An LVDT circuit board is located in the outer chamber. An end of the housing is coupled for movement with one of the links of a two-link frame. A plunger is coupled for movement with the other link and includes a shaft which slidably extends through the housing and into the inner chamber. The shaft supports the LVDT core for reciprocal movement within the hollow cylindrical coil assembly. A spring urges the plunger and housing apart and a rubber bellows is sealingly and flexibly coupled between the plunger and the housing. Alternatively, the separate spring and bellows may be replaced by a single flexible stainless steel bellows.

DETAILED DESCRIPTION

A draft sensor 10 includes a frame 12 comprised of a pair of links 14 and 16 connected together at opposite ends, as described in detail in U.S. application, Ser. No. 228,440, filed Jan. 26, 1981. A transducer 20 is inserted in the opening between the links to sense variations in the separation between the links. The frame 12 may be inserted in any member where it would be desirable to measure forces, such as in the link or links of a hitch for an agricultural vehicle (not shown).

Figure 1:
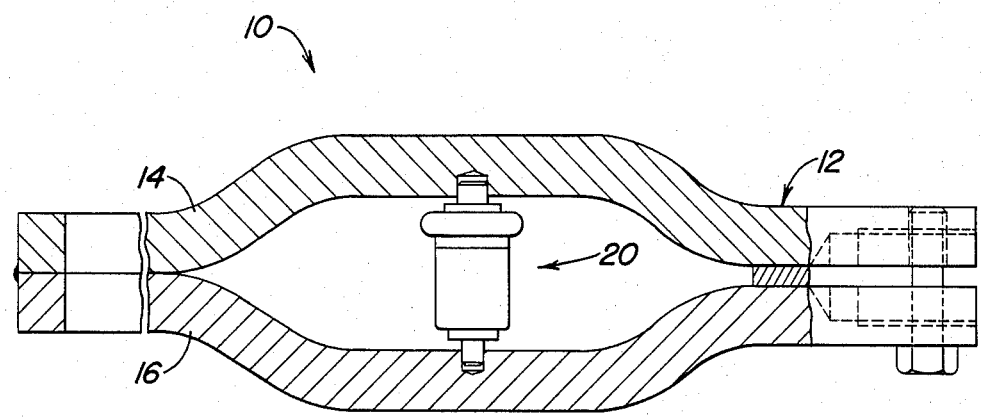
FIG. 1 is a view of a transducer and frame constructed according to the present invention.
Figure 2:
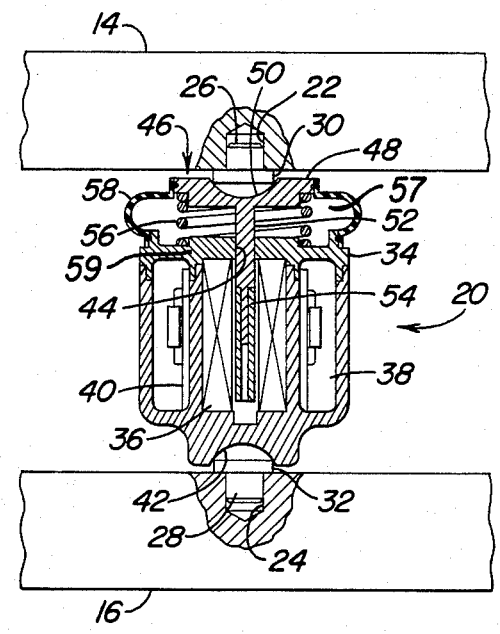
FIG. 2 is an enlarged partial sectional view of a portion of FIG. 1.

Referring now to FIG. 2, the links 14 and 16 each have blind bores 22 and 24 drilled therein. Support pins 26 and 28 are press-fitted into the bores 22 and 24 and include heads 30 and 32 with rounded bearing surfaces.

The transducer 20 has a plastic or non-magnetic cylindrical housing 34 which cooperates with the shaft 52 to form a transducer chamber which completely encloses the coil assembly 36 of a conventional linear variable differential transformer (LVDT), such as are available from Schaevitz Engineering or Trans-Tek, Inc. The housing also forms an annular outer chamber 38 which surrounds the transducer chamber. A circuit board 40 may be positioned in the outer chamber 38 for mounting thereon the components of a conventional LVDT circuit, such as described on page 17-56 of Fink's "Electronics Engineers' Handbook", McGraw-Hill, 1975. One end of the housing 34 forms a socket 42 for engaging the head 32 of support pin 28. In this manner, the circuit board 40 is entirely protected from the environment by being located in the outer chamber 38. The other end of the housing 34 has a bore 44 extending therethrough and communicating with the transducer chamber.

Figure 3:
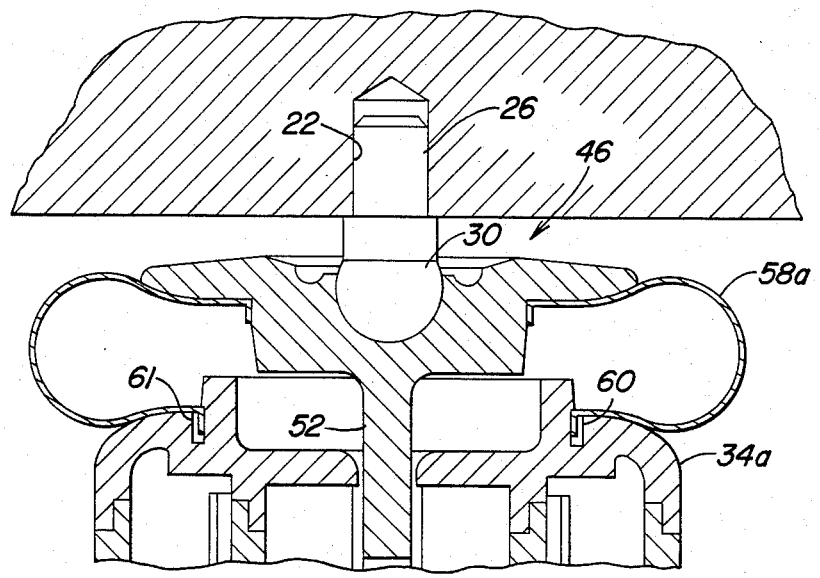
FIGS. 3 and 4 are partial views similar to FIG. 2 of alternate embodiments of the present invention.
Figure 4:
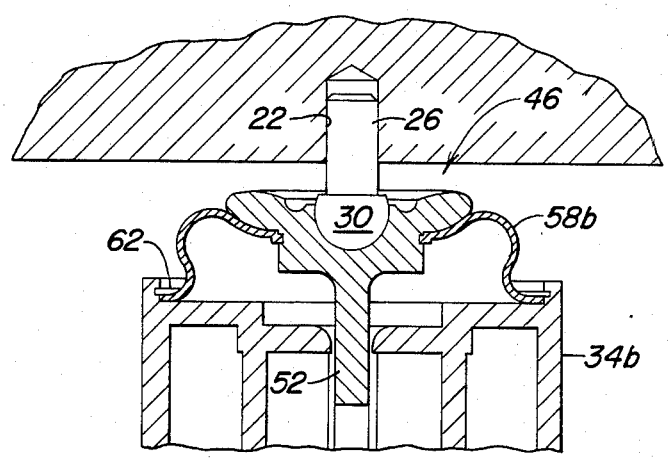

The transducer 20 also has a non-magnetic plunger 46 with a head 48 having a rounded recess 50 engaging the head 30 of support pin 26. The plunger has a shaft 52 which extends from head 48 through bore 44 to an end to which is fixed the hollow cylindrical ferrite core member 54 of the LVDT. The shaft 52 supports the core 54 for reciprocal movement with the coil assembly 36. A spring 56 is mounted over the shaft 52 and urges the plunger 46 and housing 34 away from each other so that they are maintained in contact with their respective support pins 26 and 28. A flexible exterior bellows 58 is sealingly fixed at opposite ends to the plunger 46 and the exterior of housing 34 to prevent contamination of the components of the transducer 20 from the environment. The bellows 58, housing 34 and plunger member 46 enclose an end chamber 57 which is separated from the transducer chamber by a wall 59 of the housing 34. A silicon rubber material is suitable for the bellows 58. However, as shown in FIGS. 3 and 4, the bellows 58a and 58b may be formed of stainless steel. Then, the bellows 58a and 58b may perform both the sealing function and the biasing function of the spring 56. In such cases, the spring 56 may be eliminated, as shown in FIGS. 3 and 4, unless additional stiffness beyond that provided by the stainless steel bellows 58a and 58b is desired. Note, in FIG. 3, the bellows 58a has a generally C-shaped cross-section, viewing the left half of the section, and the housing 34a has an axially extending annular groove 60 which surrounds the bore 60 and which receives an annular tab 61 on one end of the bellows 58a. In the alternative shown in FIG. 4, the bellows 58b has a generally S-shaped cross-section, viewing the left-hand half of the section. The radially inwardly extending end of the bellows 58b is sealingly coupled to a flange portion of the plunger 52, while the radially outwardly extending end of the bellows 58b is sealingly coupled to the other end of the housing 34b by means of a snap ring 62. In either case, as forces are applied to the ends of the frame 12, it deforms, and the separation of the links 14 and 16 varies, as does the position of core 54 relative to coil assembly 36. The LDVT and the circuit on board 40 can thus provide signals representing the forces applied to the frame 12. An electrical cable (not shown) is run through an access opening (not shown) in the housing 34 for connecting to the circuit (not shown).

The transducer 20 may be inserted into or removed from the frame 12 merely by compressing the bellows, the spring or both, depending upon the particular embodiment, to allow the recesses 42 and 50 to be pulled away from their respective support pins 28 and 26.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A force sensor comprising:
   a deformable frame having spaced-apart portions having a variable separation depending on force-induced deformation of the frame;
   a housing enclosing a transducer chamber therein, one end of the housing having means for coupling to one of the spaced-apart portions, the other end of the housing having a bore extending completely therethrough and communicating with the chamber;
   a position transducer disposed entirely within the chamber and having first and second relatively movable parts, the first part being carried for movement with the housing, the housing also enclosing an outer chamber for sealingly enclosing elements of a transducer circuit operably coupled to the transducer;
   a plunger member having a coupling part engageable with the other of the spaced-apart portions and a shaft slidably received by the bore and extending through the bore from the coupling part to an end fixed to the second transducer part; and
   a resilient bellows member spaced apart from the frame, exterior to the housing and flexibly and sealingly interconnecting the plunger member and the housing to prevent contamination of the transducer, the bellows being biased to urge the plunger member and the housing away from each other and the bellows being deformable to permit the housing and plunger member to be inserted into and removed from the frame.

2. The force sensor of claim 1, wherein:
   each of the frame central portions includes a blind bore extending therein;
   a pair of stub members mounted in the blind bores, each of the stub members having a bearing surface thereon;
   the housing coupling means comprising a socket engaging the bearing surface of one of the stub members; and
   the plunger member coupling part comprising a socket engaging the bearing surface of the other of the stub members.

3. The force sensor of claim 1, wherein:
   the position transducer comprises a linear variable differential transformer (LVDT), the first part being an LVDT coil assembly, the second part being a magnetic core.

4. The force sensor of claim 1, further comprising:
   a resilient member surrounding a portion of the plunger, surrounded by the bellows, having first and second ends coupled to the plunger and housing, respectively, and being biased to urge the plunger and housing away from each other.

5. The force sensor of claim 1, wherein:
   the other end of the housing includes an axially extending annular slot surrounding the bore; and
   the bellows member has a generally C-shaped cross-section, one end of the bellows having an annular tab extending therefrom which is received by the annular slot.

6. The force sensor of claim 1, wherein:
   the bellows member has a generally S-shaped cross-section with a radially inwardly extending end sealingly coupled to the plunger member and a radially outwardly extending end sealingly coupled to the other end of the housing.

7. A force sensor comprising:
   a deformable frame having spaced-apart portions having a variable separation depending on force-induced deformation of the frame;
   a housing enclosing a transducer chamber therein, one end of the housing having means for coupling to one of the spaced-apart portions, the other end of the housing having a bore extending completely therethrough and communicating with the chamber;
   a position transducer disposed entirely within the chamber and having first and second relatively movable parts, the first part being carried for movement with the housing, the housing also enclosing an outer chamber for sealingly enclosing elements to a transducer circuit operably coupled to the transducer;
   a plunger member having a coupling part engageable with the other of the spaced-apart portions and a shaft slidably received by the bore and extending through the bore from the coupling part to an end fixed to the second transducer part; and
   a resilient bellows member spaced apart from the frame, exterior to the housing and flexibly and sealingly interconnecting the plunger member and the housing to prevent contamination of the transducer, the bellows member, the housing and plunger member enclosing an end chamber separated from the transducer chamber by a wall of the housing, the bellows being biased to urge the plunger member and the housing away from each other and the bellows being deformable to permit the housing and plunger member to be inserted into and removed from the frame.

* * * * *